United States Patent
Burner et al.

(10) Patent No.: US 8,075,196 B2
(45) Date of Patent: Dec. 13, 2011

(54) PILLOW BLOCK HOUSING WITH TAPERED ROLLER BEARINGS

(75) Inventors: Bruce C. Burner, Alliance, OH (US); Gerald Fox, Massillon, OH (US)

(73) Assignee: The Timken Company, Canton, OH (US)

( * ) Notice: Subject to any disclaimer, the term of this patent is extended or adjusted under 35 U.S.C. 154(b) by 601 days.

(21) Appl. No.: 11/817,789

(22) PCT Filed: Mar. 9, 2006

(86) PCT No.: PCT/US2006/008359
§ 371 (c)(1),
(2), (4) Date: Feb. 2, 2009

(87) PCT Pub. No.: WO2006/099014
PCT Pub. Date: Sep. 21, 2006

(65) Prior Publication Data
US 2009/0190874 A1 Jul. 30, 2009

Related U.S. Application Data

(60) Provisional application No. 60/659,805, filed on Mar. 9, 2005.

(51) Int. Cl.
*F16C 23/08* (2006.01)
*F16D 11/00* (2006.01)
(52) U.S. Cl. .................. 384/558; 384/206; 384/571
(58) Field of Classification Search .............. 384/206, 384/495–498, 558, 571; 415/229
See application file for complete search history.

(56) References Cited

U.S. PATENT DOCUMENTS

| 1,966,923 | A | | 7/1934 | Couch | |
|---|---|---|---|---|---|
| 3,850,485 | A | * | 11/1974 | Zimmer et al. | 384/558 |
| 3,981,550 | A | | 9/1976 | Zimmer | |
| 4,595,302 | A | * | 6/1986 | Attinger et al. | 384/558 |
| 5,908,248 | A | | 6/1999 | Nisley | |

FOREIGN PATENT DOCUMENTS
DE 4104454 7/1992
(Continued)

OTHER PUBLICATIONS

Catalog—HUNGER-Maschinen—"Spherical Plain Bearings Rod Ends"—1997—3 pages.

(Continued)

*Primary Examiner* — William C Joyce
(74) *Attorney, Agent, or Firm* — Polster, Lieder, Woodruff & Lucchesi, L.C.

(57) ABSTRACT

A spherical outer diameter tapered roller bearing pillow block system (100) for supporting the rotating main shaft of a wind turbine. The bearing system is configured with a unitized construction and factory set preload bearing settings to facilitate installation and setup. A spherical outer diameter surface (114) is formed on the outer race (116) of a tapered roller bearing assembly disposed about the rotating main shaft of the wind turbine. The bearing assembly is secured to a stationary support structure of the wind turbine through a pillow block housing assembly (102) providing a matching spherical housing seat (112) to form a ball and socket interface between the tapered roller bearing assembly (118) and the pillow block housing assembly (102). The ball and socket interface accommodates static and dynamic misalignments between the wind turbine main shaft and the supporting structure, while the bearing assembly (118) accommodates radial and axial loads.

19 Claims, 4 Drawing Sheets

FOREIGN PATENT DOCUMENTS

| | | |
|---|---|---|
| DE | 19606312 | 8/1997 |
| DE | 10017401 | 10/2001 |
| DE | 20208073 | 11/2003 |
| GB | 1511388 | 5/1978 |
| WO | 2004027277 | 4/2004 |
| WO | 2004046582 | 6/2004 |

OTHER PUBLICATIONS

International Preliminary Report on Patentability for corresponding International application PCT/US2006/008359—Mailing date: Jul. 7, 2007.

2nd Written Opinion of the International Preliminary Examining Authority for corresponding International application PCT/2006/008359 Mailing date: May 8, 2007.

International Search Report for corresponding International application PCT/2006/008359—Mailing date: Jun. 26, 2006.

Written Opinion of the International Searching Authority for application PCT/US2006/008359 Mailing date: Jun. 26, 2006.

Catalog SFL-82—TORRINGTON—"Self-Lubricating Lined Spherical Plain Bearings"—copyright 1981—12 pages.

Web site—HUNGER-Maschinen—"Produce range spherical plain bearings/Special bearings"—dated May 26, 2009, 2 pages.

* cited by examiner

PILLOW BLOCK HOUSING WITH TAPERED ROLLER BEARINGS

CROSS-REFERENCE TO RELATED APPLICATIONS

This application is the US National Stage under 35 U.S.C. §371 of International App. No. PCT/US2006/008359 having an International filing date of Mar. 9, 2006, and which is related to, and claims priority from, U.S. Provisional Application Ser. No. 60/659,805 filed on Mar. 9, 2005 and which is hereby incorporated by reference in entirety.

TECHNICAL FIELD

This invention relates to a bearing system for use in supporting the main shaft of a wind turbine assembly, and in particular, to a bearing system incorporating a spherical outer-diameter tapered roller bearing assembly secured within a pillow block system which is capable of carrying radial and axial loads, as well as static and dynamic angular misalignments of the supported main shaft for use in wind turbine applications.

BACKGROUND OF THE INVENTION

Within the wind power industry, it is common to utilize bearing systems for the wind turbine main shafts which are configured to handle large radial loads as well as large angular misalignments between a rotating shaft and the supporting bearing axis. These main shaft bearing systems typically comprise spherical roller bearings (SRBs) having separate rotating seal carriers and a locating bearing locknut device to secure the rotating seal carriers and the spherical roller bearing inner race against a main shaft shoulder. The cylindrical outer diameter of the outer race of the spherical roller bearing is secured into a cylindrical inner diameter of a pillow block housing with an axial clamp end cover plate. The internal configurations of spherical roller bearing systems have the ability to carry large radial loads and to accommodate large dynamic and static angular misalignments, as well as modest axial loads, without generating overturning moment reactions in the pillow block housing and supporting bedplate structures. Additionally, these bearing systems require no bearing setting setup procedure, making them easy to install in practice.

However, spherical roller bearing systems have inherent problems. In particular, the spherical roller bearings must operate with a generous radial internal clearance (RIC). In a wind turbine main shaft application, dynamically variable wind loads placed on the spherical roller bearing during operation cause large axial and radial deflections within the spherical roller bearing system as a result of the large radial internal clearance. These deflections dramatically reduce spherical roller bearing life in an unpredictable manner due to a loss of load sharing to the rotor side roller row and wind vibration induced peeling and/or false brinelling of the raceway surfaces, which initiates premature raceway spalling. The deflections further reduce bearing life of a downstream gearbox input shaft support due to excessive axial shaft deflection, which in turn leads to excessive thrust loads.

The large radial internal clearance of the spherical roller bearing systems and the inherent angular degree of freedom of the outer race with respect to the inner race further requires associated axial and radial labyrinth seal gap clearances to be large enough to prevent metal-to-metal contact within the labyrinth gap between the rotating seal carrier labyrinth rings and the stationary labyrinth end covers. This large gap clearance reduces the effectiveness of the labyrinth seal in preventing lubricant loss and contaminant exclusion. Similarly, the rotating shaft seal, typically a polymer v-ring face seal, must be able to accommodate the large dynamic angular, radial, and axial motions in addition to the normal shaft rotational movement.

To gain access to the gearbox end roller row, spherical roller bearing systems typically require a loosening and sliding back of the bearing locknut and press fit rotating seal carrier labyrinth ring, which makes in-service inspection of the bearing raceway and roller surfaces on the gearbox end of the pillow block bearing difficult. Furthermore, no access is available to the rotor end roller row, because the rotor end stationary labyrinth seal end cover is trapped by the rotating seal carrier labyrinth ring, which cannot be removed unless the main shaft is withdrawn from the spherical roller bearing system, a very difficult or impossible task within the application environment of an operating wind turbine.

Accordingly, there is a need for a wind turbine main shaft support bearing system which is capable of carrying the expected application loads experienced in the wind turbine operational environment, which does not require large radial internal clearances associated with the supporting roller elements and hence has a predictable operational life, and which does not require large axial and radial labyrinth seal gap clearances to prevent metal-to-metal contact within the labyrinth gap between the rotating seal carrier labyrinth rings and the stationary labyrinth end covers.

Additionally, there is a need for a wind turbine main shaft support bearing system which does not require a loosening and sliding back of the bearing locknut and press fit rotating seal carrier labyrinth ring to enable in-service inspection of the gearbox end bearing raceway and roller surfaces, and which provides a means to access the rotor end roller row.

SUMMARY OF THE INVENTION

Briefly stated, the present invention provides a spherical outer-diameter tapered roller bearing system for use in wind turbine main shaft support applications. The tapered roller bearing system is configured with a unitized construction and preload bearing settings to facilitate installation and setup into a supporting pillow block housing. A spherical outer diameter surface (ball) is formed on the tapered roller bearing assembly outer race with a matching inner diameter surface (socket) disposed in the pillow block housing assembly to facilitate assembly and ball-socket preload adjustment.

In an embodiment of the spherical outer-diameter tapered roller bearing system of the present invention, rotating and static seal carriers form labyrinth seals on opposite sides of the tapered roller bearing assembly, and carry elastomeric face seals to prevent contaminates from entered the labyrinth seals and the ball and socket interface. The seal carriers are isolated from the pillow block housing to reduce experienced angular, radial, and axial movements. The assembly has the ability to tolerate static angular misalignment as well as dynamic operating misalignment due to an anti-friction, anti-wear liner applied to the spherical split cup seat. In addition to misalignment compensation, the liner reduces overturning moment reactions through the pillow block and into the support framework, which is further facilitated by a TDO-style mounting configuration of the bearing system.

In an embodiment of the spherical outer-diameter tapered roller bearing system of present invention the matching inner diameter surface (socket) disposed in the pillow block housing assembly is formed by an anti-friction liner insert having a cylindrical outer diameter configured to seat within a cylindrical inner diameter of the pillow block housing. A spherical inner diameter of the anti-friction liner is sized to receive the spherical outer diameter of the tapered roller bearing system outer race in a ball and socket configuration.

BRIEF DESCRIPTION OF THE DRAWINGS

In the accompanying drawings which form part of the specification.

Corresponding reference numerals indicate corresponding parts throughout the several figures of the drawings.

BEST MODE FOR CARRYING OUT THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Turning to FIGS. 1-4, a first illustrative embodiment of a bearing assembly of the present invention for use in supporting a wind turbine main shaft is shown generally at 100. The bearing assembly 100 includes a pillow block housing 102 having an outer surface 104, a gear-box end surfaces 106, and a rotor-end surface 108. The outer surface 104 is configured with suitable attachments to couple the pillow block bearing assembly 100 to a supporting structure (not shown), preferably using a TDO (TNA) style mounting configuration which, by virtue of a larger effective spread and indirect mounting style, is able to generate overturning moment reactions with relative ease for the purpose of enabling angular alignment adjustments at the spherical outer diameter ball surface 114. A curved inner surface 110, either formed directly in the pillow block housing 102, or by means of a liner insert, defines a spherical housing seat or socket 112. A tapered roller bearing system (118) is axially contained within the pillow block housing 102, by a matching spherical outer diameter ball surface 114 formed on an outer diameter of an outer race 116.

The spherical housing seat (socket) 112 and the spherical outer diameter ball surface 114 define a ball and socket interface which allows for a limited amount of movement between the pillow block bearing housing 102 and the tapered roller bearing system 118 supporting the wind turbine main shaft S. A socket anti-friction liner 115 may optionally be provided between the ball surface 114 and the socket surface 112. One or more grease supply ports 117 at either end of the ball/socket just inside the static seals enables grease to act as a barricade to entry of contaminants/moisture, even if the anti-friction socket liner 115 requires no lubrication. For anti-friction socket liners 115 which require a supply of lubricant, it will be recognized that any of a variety of conventional lubricant delivery means may be employed, including providing lubrication supply ports through the housing 102 and the anti-friction socket liner to the ball surface 114. It will further be recognized that the socket anti-friction liner 115 may be of a unitary construction, or alternatively, may be composed from multiple components or multiple segments, such as a cylindrical backing element seated within a cylindrical inner diameter of the housing supporting an anti-friction element having a spherical inner diameter to provide the socket surface 112. Alternatively, the curved inner surface 110 defining the socket 112 may be cylindrically formed to received a matching outer diameter of the anti-friction liner 115, with the inner diametrical surface of the anti-friction liner 115 providing the specific curvature required for the socket 112.

In the embodiment of the present invention illustrated in FIGS. 1-4, a portion of the spherical housing seat (socket) 112 is formed by means of an extended portion 119A of an annular clamp plate 119B which is secured to the housing surface 108 by means of bolts. An annular spacer 121 secured between the annular clamp plate 119B and the housing surface 108 is selected to achieve the desired spacing and preload at the ball and socket interface. Those of ordinary skill in the art will recognize that a variety of means may be employed in place of the annular spacer 121 to achieve the desired preload at the ball and socket interface, including spring means, Belleville washer means, and bolt circle clamping means.

The contained tapered roller bearing (TRB) system 118 consists of two rows of inwardly-directed tapered roller bearings 120 retained by a cage 122 between outer raceways 124A and 12B of the outer race 116, and inner raceways 126A and 126B of a set of inner races 128A and 128B disposed about the wind turbine main shaft S. The inner races 128A and 128B may optionally be coupled together with a retention band 130 disposed about the wind turbine main shaft S.

Figure 3:
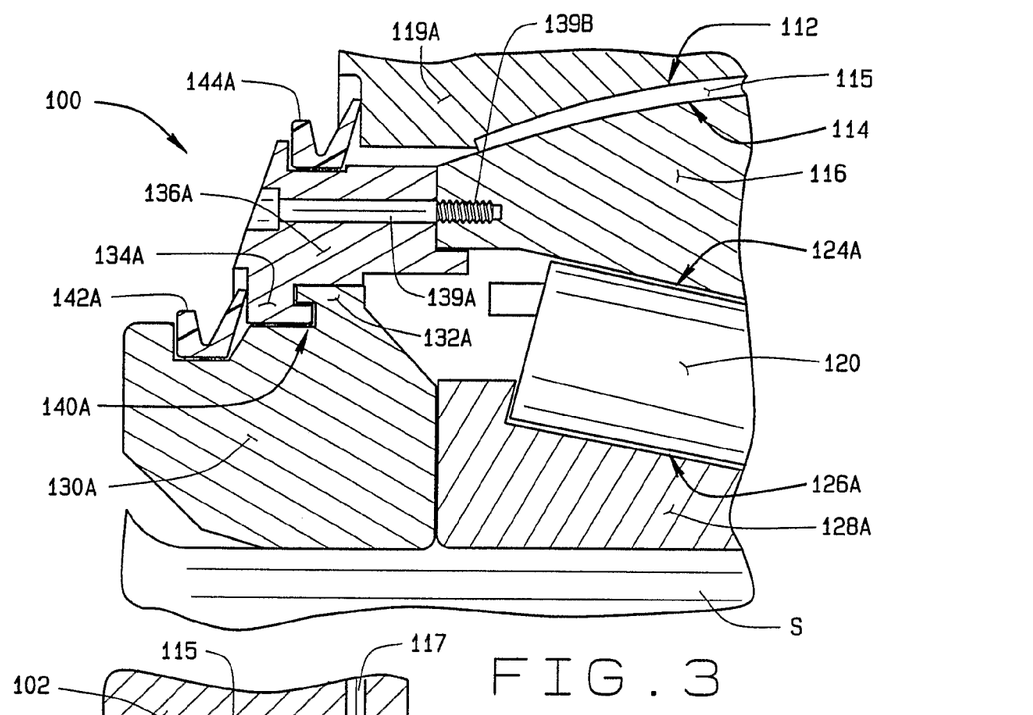
FIG. 3 is an enlarged sectional view of a hub side of the pillow block bearing of FIG. 1.
Figure 4:
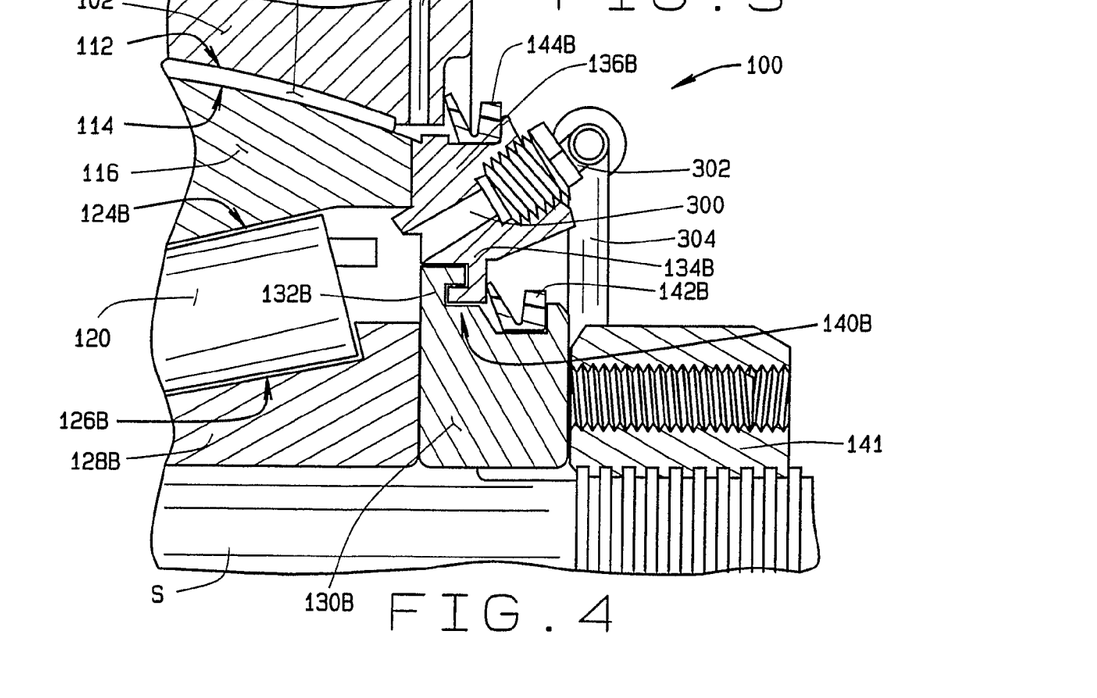
FIG. 4 is an enlarged sectional view of a gearbox side of the pillow block bearing of FIG. 1.

In one embodiment, the tapered roller bearing system 118 is enclosed on each side by an arrangement of seal elements. Turning to FIGS. 3 and 4, a first rotating seal carrier 130A is disposed against the rotor-end of the inner race 128A, while a second rotating seal carrier 130B is disposed against the gear-box end of the inner race 128B. The rotating seal carriers 130A and 130B each defines a set of labyrinth rings 132A and 132B, respectively, which function with associated second sets of labyrinth rings 134A and 134B carried on annular static seal carrier members 136A and 136B to define annular labyrinth seals 140A and 140B about the opposite sides of the tapered roller bearing system 118. The static seal carrier members 136A and 136B are each removably secured in a fixed relationship to the outer race 116 by means of a plurality of engaging bolts 137 passed through bores 139A into threaded receiving recesses 139B in the outer race 116.

The labyrinth seals 140A, 140B formed between the labyrinth fingers 132 and 134 of the respective static seal carriers 136 and the rotating seal carriers 130 may be designed with smaller axial and radial clearance than is possible with conventional spherical roller bearing pillow block designs. This is due to the mounting of the non-rotating static seal carriers 136A, 136B to the tapered roller bearing spherical outer race 116, and not to the pillow block housing 102, or to the annular clamp plate 119B, effectively removing the requirement of the labyrinth seals 140A, 140B to provide clearance for the angular displacement of the spherical outer diameter ball socket. Additionally, due to the nature of the preload setting in the tapered roller bearing assembly 118, compared to the radial internal clearance of the conventional spherical roller bearing designs, much less radial and axial deflection will occur under the application loads. This permits the use of smaller and thus more effective labyrinth seal designs.

Figure 1:
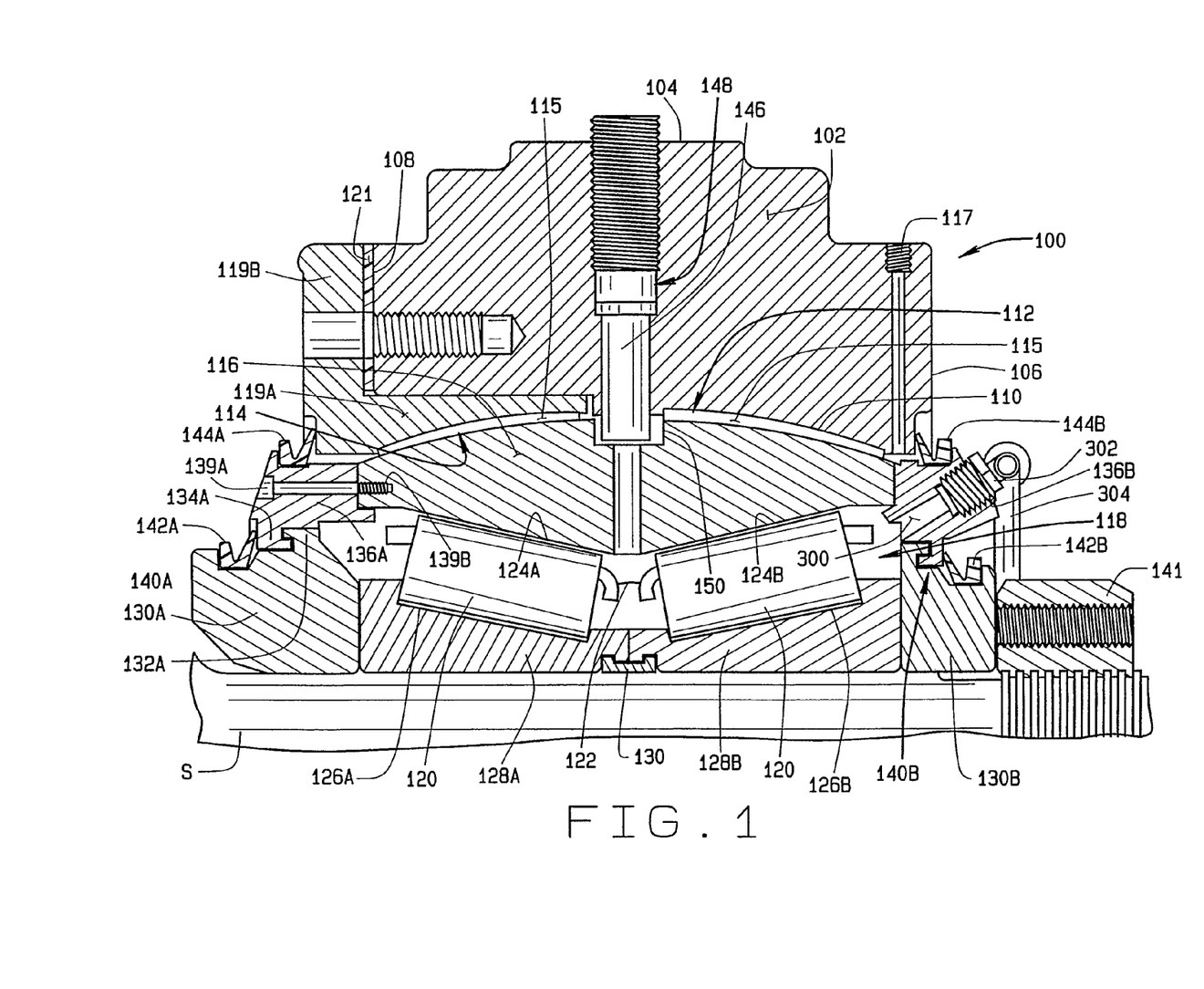
FIG. 1 is a cross-sectional view of the pillow block bearing assembly of the present invention.

As can be seen best in FIGS. 1 and 3, the non-rotating static seal carrier members 136A and 136B may be unfastened from the outer race 116, and displaced away from the pillow block housing 102 along the main shaft S for easy 360-degree access to either the gear-box side or rotor side bearing raceways, at any time after the assembly 100 is mounted into the application, without disturbing an assembly retaining "bolt-circle" bearing locknut 141 or the annular clamp plate 119B. The inner bore diameter of the static seal carrier members 136A and 136B, and the labyrinth fingers 134A, 134B, are sized to permit the static seal carrier members 136A, 136B to slide over the respective rotating seal carriers 130A, 130B, the bearing locknut 141, and main shaft S shoulder (not shown) during removal.

Replaceable elastomer face seals 142A and 142B, such as a v-ring seals, are used as a rotating shaft seals for sealing the labyrinth seals 140A and 140B of the tapered roller bearing system 118. Each face seal 142A and 142B is mounted to press fit the associated rotating seal carrier 130A and 130B, and acts as a rotating seal, sealing against counter-faces on the non-rotating static seal carrier labyrinth rings 134A and 134B. The rotating seals 142A, 142B are isolated from the angular displacements of the outer race 116 of the tapered roller bearing system 118 relative to the pillow block housing 102, reducing seal motion and improving seal performance.

The performance of the rotating shaft seals 142A, 142B is further enhanced because the axial and radial and angular deflections experienced by these seals are significantly smaller than the equivalent spherical roller bearing deflections of the prior art designs, as the tapered roller bearing assembly 118 is in a preload condition, while the spherical roller bearing designs must incorporate generous radial internal clearances.

A second set of replaceable elastomer face seals 144A and 144B, such as a v-ring seals, are disposed to seal the ball and socket interface between the outer diameter (ball) surface of the outer race 116 and the pillow block housing curved inner surface 110. The second face seals 144A and 144B are mounted to the corresponding static seal carrier member 136A and 136B adjacent the ball and socket interface. The static seal carrier members 136A and 136B are removably secured in a fixed relationship to the outer race 116, and the face seals 144A and 144B are isolated from any displacements of the inner races 128A, 128B or shaft rotation, thereby reducing seal deflection and wear, while improving seal performance.

With this configuration, the entire ball surface 114 is protected from corrosion, and contamination, similar to a boot type enclosure, while enabling old and/or used lubricant to easily pass outward during a re-grease procedure.

Face seals 144A and 144B are essentially static seals, with the ball and socket motion preferably restricted by an anti-rotation pin 146 seated within a perpendicular bore 148 in the pillow block housing 102 and an aligned oversize recess 150 in the outer race 116, which limits the angular motion to a few degrees. The anti-rotation pin 146 additionally prevents the spherical outer race 116 from rotating with the shaft S. Optionally, the perpendicular bore 148 may be threaded to receive an eyebolt (not shown) or other attachment component, facilitating movement and transport of the bearing assembly 100.

Those of ordinary skill in the art will recognize that while elastomer face seals 142A, 142B, and 144A, 144B have been illustrated and described, other suitable types of seal elements may be utilized within the scope of the present invention to prevent contaminate entry into the labyrinth seals 140A, 140B and the ball and socket interface region, while still allowing old/used lubricant to easily pass outward during a re-greasing procedure.

Those of ordinary skill will further recognize that since the entire spherical ball surface 114 is isolated within the seals 144A, 144B, ball surface modifications to enhance hardness or lubricity need not necessarily improve corrosion resistance, as would be required with o-rings or scraper type seals that would allow a portion of the ball surface 114 to rotate into and out of the protected interior interface. This permits a wider choice in possible surface treatments for the ball and socket surfaces to enhance hardness and reduce wear, roughness, and friction. This allows the angular misalignment and radial and axial load carrying functionality of a conventional spherical roller bearing system to be duplicated (or increased in the case of axial load capacity) by the system 100 of the present invention, but without the inherent problems associated with the radial internal clearance of the spherical roller bearings and the associated negative effects on main shaft bearing life, main shaft bearing labyrinth and shaft seal performance, and gearbox input shaft bearing life.

It will be recognized that a number of variations of the present invention may be made without departing from the scope of the invention. For example, the use of a 'bolt circle' type of bearing locknut 141 provides retention of bearing preload settings in the tapered roller bearing assembly 118. Conventional spanner style bearing locknuts in a simple retention mode do not provide the axial forces required to preload the tapered roller bearing inner races 128A, 128B and the rotating seal carriers 130A, 130B against the rotor side shoulder (not shown) of the main shaft S. Use of the 'bolt circle' style of bearing locknut 141 reduces field assembly wrench torque requirements and prevents potential injury to an operator installing or servicing the bearing assembly 100. Other types of bearing locknut which provide similar axial force operating characteristics sufficient to maintain desired preload settings may be utilized without departing from the scope of the present invention.

Figure 5:
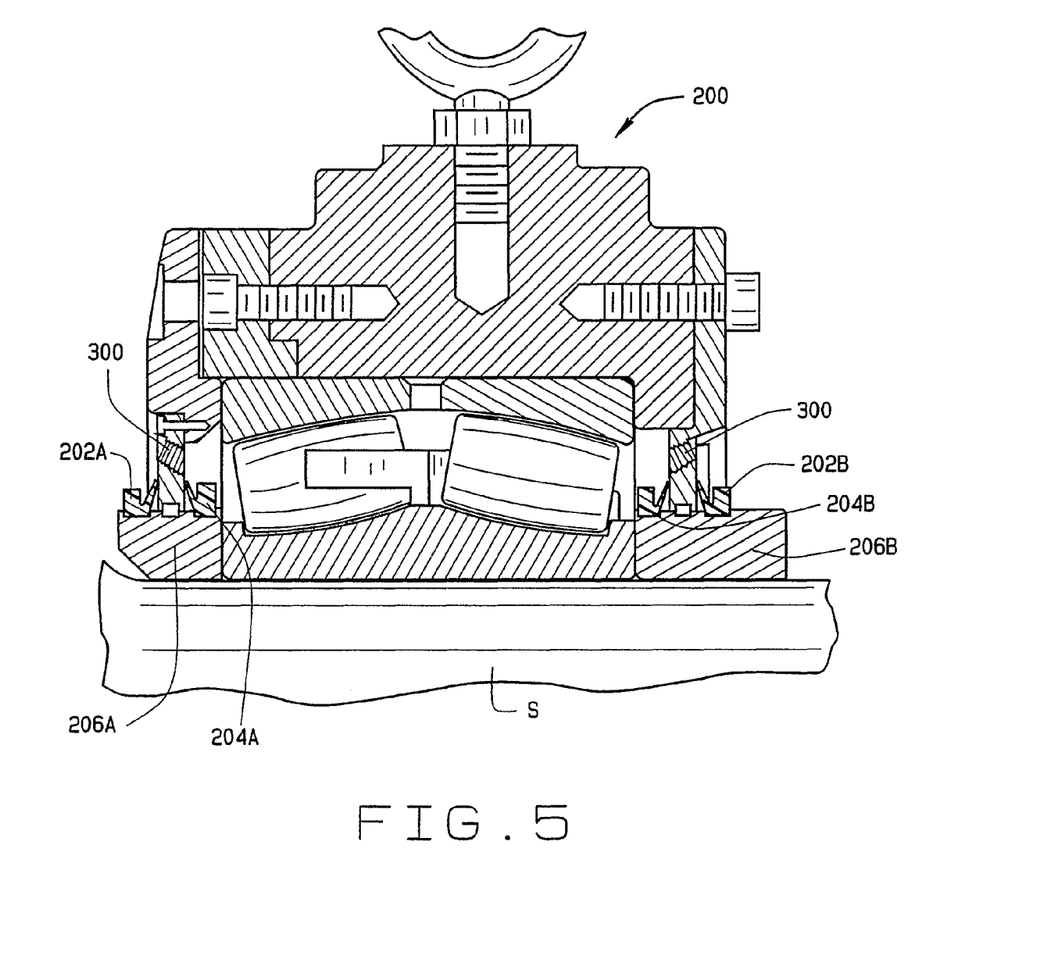
FIG. 5 is a sectional view of a dual dynamic v-ring seal configuration of with a spherical roller bearing assembly.

It will similarly be recognized that more than one v-ring type seal 142A, 142B may be mounted at each end of the tapered roller bearing assembly 118 to enhance the sealing performance. For example, as is illustrated in FIG. 5, a lip-to-lip v-ring seal configuration is shown with a spherical roller bearing assembly 200. With a lip-to-lip v-ring seal configuration, a pair of v-ring seals 202A, 202B and 204A, 204B are disposed on opposite sides of the bearing assembly 200. Each pair of v-ring seals includes an outer v-ring seal 202 and an inner v-ring seal 204 facing each other in a retain-grease, exclude contaminates orientation. Each v-ring seal is mounted to the associated rotating seal carrier members 206A, 206B, and acts to prevent lubricants and contaminates from passing into and out of the bearing assembly 200. This arrangement, in addition to the previous described single v-ring seal design, can also be used when retro-fitting a tapered roller bearing pillow block system 100 of the present invention into the existing housing of a conventional spherical roller bearing assembly 200, such as with the use of an anti-friction liner 115 having a cylindrical outer diameter and a spherical inner diameter to support the tapered roller bearing system 118 having a spherical outer diameter outer race 116.

Figure 2:
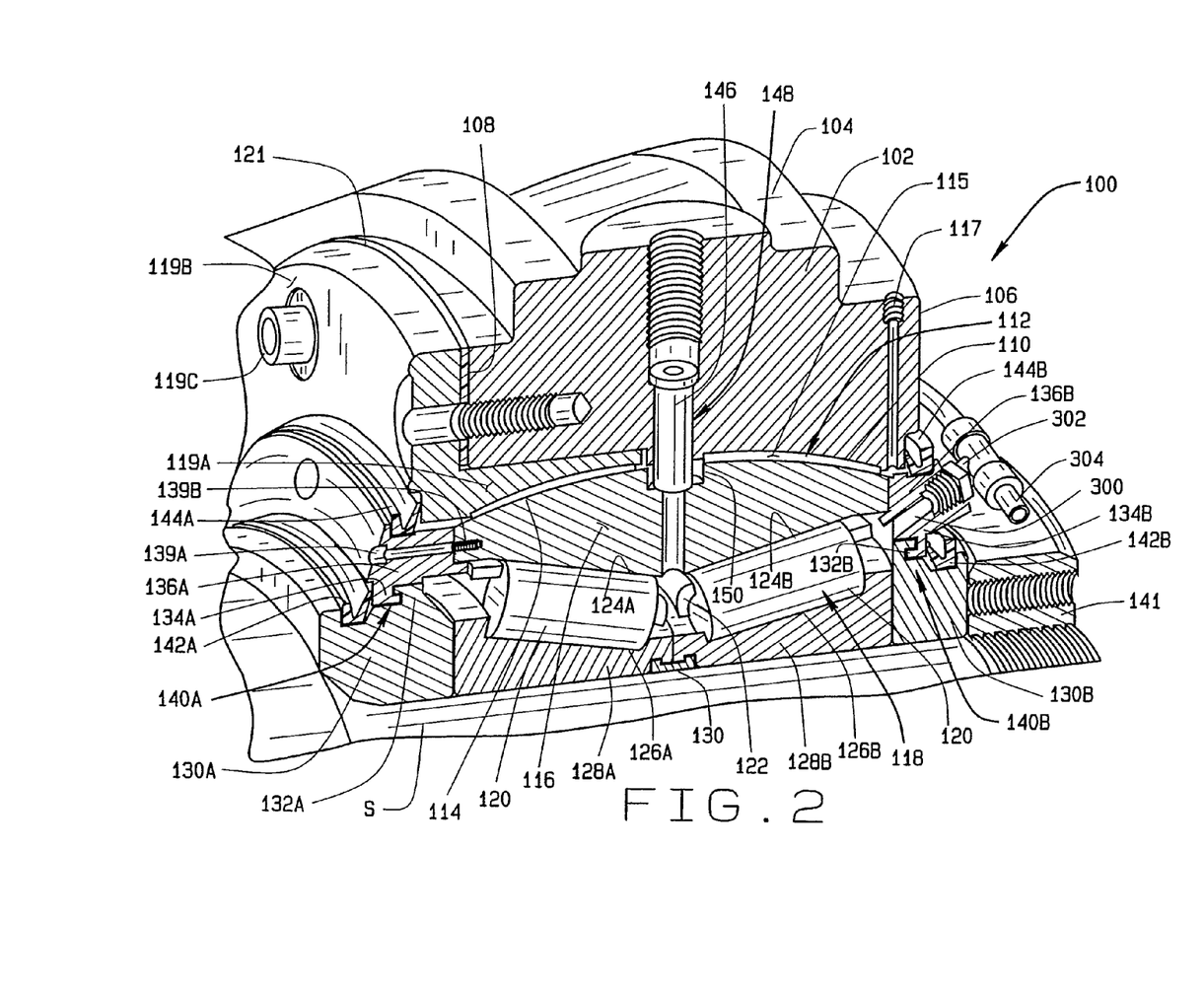
FIG. 2 is a perspective sectional view of the pillow block bearing assembly of FIG. 1.

Within any bearing assembly, it is necessary to ensure a proper flow of lubricant to the bearing surfaces and removal of used and/or contaminated lubricant. As best seen in FIGS. 2 and 4, used grease/excess grease seal bypass ports 300, used grease tubing connectors 302, and grease tubing 304 transfer used lubricant from the bearing assembly 118 to a central collection container (not shown) to reduce a tendency of grease to purge through the labyrinth seals 140. A grease return means is required for dual dynamic v-ring type seal designs such as shown in FIG. 5, where the v-ring seals are facing each other in a retain grease/exclude contaminants orientation. In this dual design, grease would not be able to purge out at all except through the bypass holes.

To facilitate removal of excess grease after re-grease application and to prevent over heating of the bearing, it is necessary to control the back pressure in the grease tubing 304. Control of back pressure may be accomplished by increasing the size of the lines 304 and fittings 302, by providing a sufficient number of lines 304, connecting fewer bypass holes per each line, or by plugging the grease lines 304 selectively and centrally at the used grease collection container (not shown) to increase back pressure to prevent unwanted loss of lubricant during normal operation.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A wind turbine bearing system for supporting a rotating main shaft of a wind turbine, comprising:

a double-row tapered roller bearing assembly, said double-row tapered roller bearing assembly including an inner race element having an axial bore through which, in use, a rotating main shaft of a wind turbine passes, a set of inwardly-directed tapered bearings seated within corresponding inner raceways in an outer diameter of the inner race element, and an outer race element having corresponding outer races on an inner diameter within which said bearings are seated, said outer race element having a spherical outer diameter defining a ball surface;

a pillow block housing assembly configured for attachment to a stationary support structure, said pillow block housing assembly including an anti-friction liner, said anti-friction liner having a spherical inner diameter which defines a socket surface, said socket surface matched to said ball surface to comprise a ball and socket interface between said pillow block housing assembly and said bearing assembly;

said double-row tapered roller bearing assembly being supported in said pillow block housing assembly by said anti-friction liner and being movable within and with respect to said pillow block housing assembly; whereby said outer race will move with axial, radial, and angular movement of said shaft and inner race; thereby reducing the transfer of overturning moments to the rolling elements and the pillow block housing assembly;

first and second rotating seal carriers on opposite sides of said inner race element, each of said rotating seal carriers including first labyrinth seal fingers;

first and second static seal carriers secured to opposite sides of said outer race element, each of said static seal carriers including second labyrinth seal fingers, said second labyrinth seal fingers meshing with said first labyrinth seal fingers to define a labyrinth seal adjacent each edge of said bearing assembly; at least one of said first and second static seal carriers being removable from said outer race element;

each of said rotating seal carriers securing a rotating face seal against a portion of said second labyrinth seal fingers of an adjacent static seal carrier to exclude contaminates from said labyrinth seals;

each of said static seal carriers securing a static face seal against an edge surface of said pillow block housing assembly adjacent said ball and socket interface to exclude contaminates from said ball and socket interface;

wherein said static seal carriers are isolated from inner race element displacements and shaft rotations; and wherein said rotating seal carriers are isolated from angular displacements of said outer race element relative to the pillow block housing assembly.

2. The wind turbine bearing system of claim 1 wherein said double-row tapered roller bearing assembly is configured with an adjustable bearing preload.

3. The wind turbine bearing system of claim 1 further including a bearing locknut secured about the main shaft, said bearing locknut maintaining a preload on said double-row tapered roller bearing assembly.

4. The wind turbine bearing system of claim 3 wherein said bearing locknut is a bolt circle bearing locknut.

5. The wind turbine bearing system of claim 1 wherein said ball and socket interface is configured with a setting, said setting selected from a set of settings including a preload setting, a line-to-line setting, and an end-play setting.

6. The wind turbine bearing system of claim 5 wherein said setting is adjustable.

7. The wind turbine bearing system of claim 1 wherein said anti-friction liner has a unitary construction.

8. The wind turbine bearing system of claim 1 wherein said anti-friction liner is restrained against rotation relative to said pillow block housing assembly.

9. The wind turbine bearing system of claim 1 wherein each of said static seal carriers has an inner bore diameter which is greater than an outer diameter of each of said rotating seal carriers, whereby said static seal carriers may be axially displaced from said pillow block bearing system without removal of said rotating seal carriers.

10. The wind turbine bearing system of claim 1 wherein each rotating face seal is fitted to said rotating seal carrier.

11. The wind turbine bearing system of claim 1 wherein movement of said ball surface is restrained between said static face seals.

12. The wind turbine bearing system of claim 11 wherein said movement of said ball surface is restrained by an anti-rotation pin, said anti-rotation pin being seated within a bore of said pillow block housing assembly and extending into an aligned oversize recess within said outer race element; and wherein engagement between said anti-rotation pin and surfaces of said aligned oversize recess define a limited range of movement for said ball surface relative to said socket surface.

13. The wind turbine bearing system of claim 1 wherein each of said rotating face seals is a v-ring seal; and wherein each of said static face seals is a v-ring seal.

14. The wind turbine bearing system of claim 1 further including a plurality of seal bypass ports in each of said static seal carriers, each of said seal bypass ports providing a lubricant passage between said bearing assembly and a lubricant transfer system.

15. The wind turbine bearing system of claim 1 wherein said liner is segmented.

16. The wind turbine bearing system of claim 1 wherein said liner comprises a first section fixed relative to said housing assembly and a second section movable axially relative to said housing assembly; wherein, one or both of said liner sections are segmented.

17. The wind turbine bearing system of claim 16 wherein pillow block housing assembly includes first and second members, at least a portion of said second member being seated within said first member; and said housing second member being coupled to said housing first member, said housing first member receiving said fixed section of said liner; said housing second member having a spherical inner diameter surface; said housing second member receiving said movable section of said liner.

18. A wind turbine bearing system for supporting a rotating main shaft of a wind turbine, comprising:

a double-row tapered roller bearing assembly, said double-row tapered roller bearing assembly including an inner race element having an axial bore through which, in use, a rotating main shaft of a wind turbine passes, a set of inwardly-directed tapered bearings seated within corresponding inner raceways in an outer diameter of the inner race element, and an outer race element having corresponding outer races on an inner diameter within which said bearings are seated, said outer race element having a spherical outer diameter defining a ball surface;

a pillow block housing assembly configured for attachment to a stationary support structure, said pillow block housing assembly including an anti-friction liner, said anti-friction liner having a spherical inner diameter which defines a socket surface, said socket surface matched to said ball surface to comprise a ball and socket interface between said pillow block housing assembly and said bearing assembly;

first and second rotating seal carriers disposed about the main shaft on opposite sides of said inner race element, each of said rotating seal carriers including a set of outer diameter labyrinth seal fingers;

first and second static seal carriers secured to opposite sides of said outer race element, at least one of said first and second static seal carriers being removably secured to said outer race element; each of said static seal carriers including a set of inner diameter labyrinth seal fingers, said inner diameter labyrinth seal fingers aligned with said outer diameter labyrinth seal fingers to define a labyrinth seal adjacent each edge of said bearing assembly; and each of said rotating seal carriers securing a rotating face seal against a portion of said inner diameter labyrinth seal fingers of an adjacent static seal carrier to exclude contaminates from said labyrinth seals.

19. The wind turbine bearing system of claim 18 including each of said static seal carriers securing a static face seal against an edge surface of said pillow block housing assembly adjacent said ball and socket interface to exclude contaminates from said ball and socket interface.

* * * * *